United States Patent
Karras et al.

(10) Patent No.: US 9,405,508 B2
(45) Date of Patent: Aug. 2, 2016

(54) SORTING WITH KEY MODIFICATION

(71) Applicant: NVIDIA Corporation, Santa Clara, CA (US)

(72) Inventors: Tero Tapani Karras, Helsinki (FI); Timo Aila, Tuusula (FI)

(73) Assignee: NVIDIA CORPORATION, Santa Clara, CA (US)

( * ) Notice: Subject to any disclaimer, the term of this patent is extended or adjusted under 35 U.S.C. 154(b) by 146 days.

(21) Appl. No.: 13/899,319

(22) Filed: May 21, 2013

(65) Prior Publication Data

US 2014/0351276 A1 Nov. 27, 2014

(51) Int. Cl.
*G06F 7/00* (2006.01)
*G06F 17/30* (2006.01)
*G06F 7/24* (2006.01)

(52) U.S. Cl.
CPC ........................................ *G06F 7/24* (2013.01)

(58) Field of Classification Search
USPC ........................................................ 707/756
See application file for complete search history.

(56) References Cited

U.S. PATENT DOCUMENTS

| | | | |
|---|---|---|---|
| 5,826,262 | A | 10/1998 | Bui et al. |
| 6,292,795 | B1 * | 9/2001 | Peters et al. |
| 7,299,317 | B1 | 11/2007 | Panigrahy et al. |
| 7,475,071 | B1 | 1/2009 | Liu et al. |
| 7,512,617 | B2 | 3/2009 | Lock et al. |
| 2004/0051728 | A1 | 3/2004 | Vienneau et al. |
| 2004/0249781 | A1 | 12/2004 | Anderson |
| 2005/0165850 | A1 * | 7/2005 | Mosescu ........................ 707/200 |
| 2006/0139349 | A1 | 6/2006 | Reshetov et al. |
| 2008/0074417 | A1 | 3/2008 | Mejdrich et al. |
| 2009/0106530 | A1 | 4/2009 | Lauterbach et al. |
| 2009/0177657 | A1 * | 7/2009 | Carroll .............................. 707/7 |
| 2010/0085352 | A1 | 4/2010 | Zhou et al. |
| 2011/0219069 | A1 | 9/2011 | Varvello et al. |
| 2011/0316854 | A1 | 12/2011 | Vandrovec |
| 2012/0023082 | A1 | 1/2012 | Kotha et al. |
| 2012/0173500 | A1 | 7/2012 | Chakrabarti et al. |
| 2012/0299914 | A1 | 11/2012 | Kilpatrick et al. |
| 2012/0313944 | A1 | 12/2012 | Kontkanen et al. |
| 2012/0320073 | A1 | 12/2012 | Mason |
| 2013/0034309 | A1 | 2/2013 | Nystad et al. |

OTHER PUBLICATIONS

Merrill, D. et al., "High Performance and Scalable Radix Sorting: A Case Study of Implementing Dynamic Parallelism for GPU Computing." Parallel Processing Letters vol. 21, Issue No. 02, Jun. 2011, pp. 245-272.

Karras, T. "Maximizing Parallelism in the Construction of BVHs, Octrees, and k-d Trees." Proceedings of the Fourth ACM SIGGRAPH/Eurographics conference on High-Performance Graphics, Eurographics Association, Jun. 2012, 5 pages.

(Continued)

*Primary Examiner* — Alex Gofman
*Assistant Examiner* — Muluemebet Gurmu

(57) ABSTRACT

This disclosure is directed to systems and methods for sorting data in which pre-sorting operations are performed on keys prior to those keys being reordered within memory. One example method includes generating, for each of a plurality of keys, an associated modified key. This operation is an example pre-sorting operation that occurs prior to any reordering of the keys. Once the modified keys are generated, the modified keys and/or associated information are processed in order to change the ordering of the keys in memory.

10 Claims, 2 Drawing Sheets

(56) References Cited

OTHER PUBLICATIONS

S. A. Cameron and C. K. Yap, Renement Methods for Geometric Bounds in Constructive Solid Geometry, ACM Transactions on Graphics, 11 (1):12{39, Jan. 1992.

Cohen, Jonathan D., et al. "I-Collide: An Interactive and Exact Collision Detection System for Large-Scale Environments." Proceedings of the 1995 symposium on Interactive 3D graphics. ACM, 1995.

Foley, Tim, and Jeramy Sugerman, "KD-Tree Acceleration Structures for a GPU Ray Tracer." Proceedings of the ACM SIGGRAPH/EUROGRAPHICS conference on Graphics hardware. ACM, 2005.

Gebali, Fayez, "Algorithms for Parallel Computing", John Wiley & Sons, Inc., Apr. 19, 2011, p. 2,137-139.

Lauterbach, et al., Fast BVH Construction on GPUs, 2009, Computer Graphics Forum, vol. 28, No. 2, pp. 375-384.

\* cited by examiner

SORTING WITH KEY MODIFICATION

BACKGROUND

Computers employ a very wide variety of sorting methods. Different methods provide different advantages and are subject to various shortcomings depending on the setting in which they are employed. The discussion is directed to an improved sorting method including pre-sorting steps that provide significant advantages relative to existing solutions in graphics processing and other settings.

DETAILED DESCRIPTION

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree. The claims appended to this description uniquely define the subject matter claimed herein. The claims are not limited to the example structures or numerical ranges set forth below, nor to implementations that address the herein-identified problems or disadvantages of the current state of the art.

The present discussion is directed to improved sorting methods that conduct various processing operations on sort keys prior to the sort keys being reordered in memory. The pre-sorting processing operations in general enable the ultimate sorting operation to act upon a smaller amount of data. In certain settings, for example radix sort and/or counting sort, this speeds up sorting and reduces power consumption, and can provide other advantages.

One example method involves, for each of a plurality of initial sort keys, creating a modified key and associating the modified key with the initial key. Processing is then performed on the modified keys as part of a process that results in the initial keys (and optionally any payload associated with them) being reordered within memory into a desired sequence. In some embodiments, the modified keys are smaller in size than the initial keys. This can be achieved by compressing the initial keys and/or by generating a temporary data structure, such as a bit vector or a search tree, having entries to which the initial keys may be assigned. The compression may be achieved by processing a subset of the bits of the initial keys. After one or more of the pre-processing operations are performed, the output data (e.g., modified/compressed keys and/or associated data/information) is processed to achieve a desired reordering of the initial keys in memory.

Figure 1:
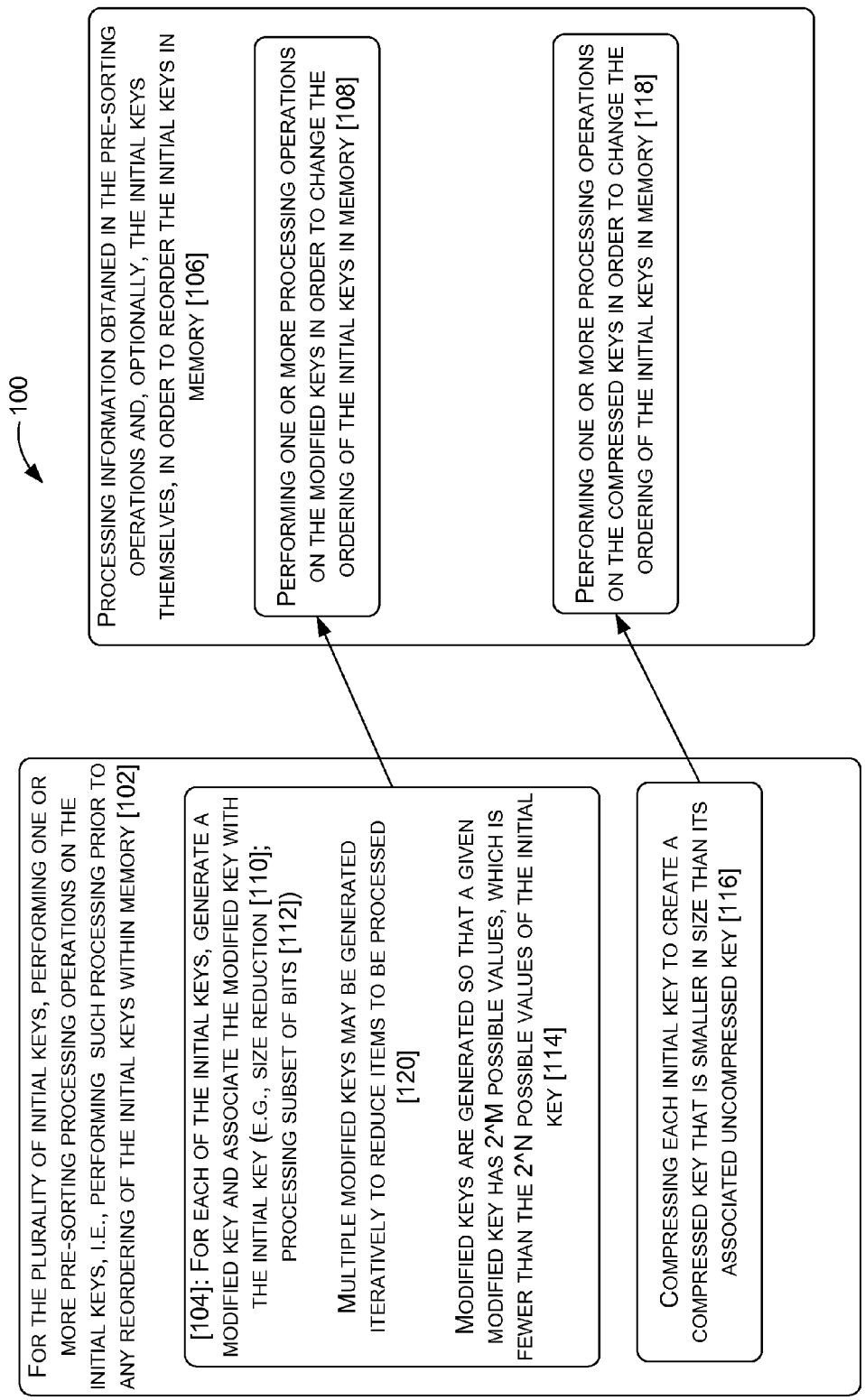
FIG. 1 depicts an exemplary method implementation for sorting keys in order to reorder the keys within a memory/storage subsystem of a computing device.

Referring now to FIG. 1, the figure discloses an exemplary method 100 for reordering keys within a memory subsystem of a computing device. The keys to be sorted can be any type of key that can be described with a numerical value, and that are ultimately sorted based on that numerical value. In some examples, the keys to be sorted may have different sizes, though many of the examples herein are presented in the context of keys having a fixed size, for example all of the keys having a value that can be expressed with N bits. Prior to being reordered, the keys may be in what is referred to as an uncompressed state.

Figure 2:
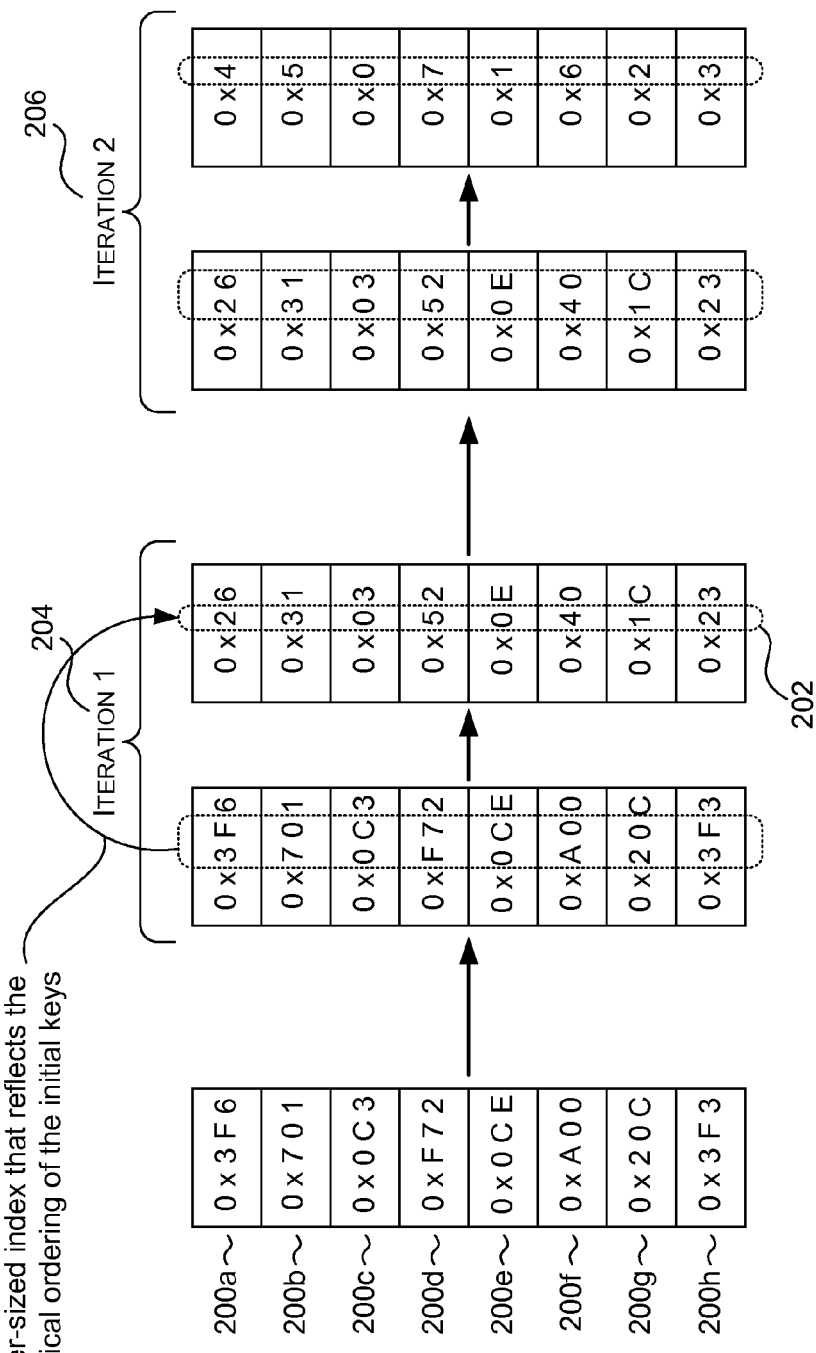
FIG. 2 depicts a plurality of initial keys and exemplary pre-sorting operations that can be performed on those keys without changing their ordering within memory.

Method 100 will be described in the context of an exemplary group of keys 200 that are shown in FIG. 2. The individual keys of FIG. 2 are suffixed with letters (key 200a, key 200b, etc.) to specifically identify individual keys. In the example of FIG. 2, there are eight 12-bit keys, such that each key can take on one of 2^12 possible values.

At 102, method 100 includes performing one or more pre-sorting operations on a plurality of initial keys. In this example, "pre-sorting" signifies that the operations are performed prior to any reordering of the keys in memory. As shown at 104, the pre-sorting operations may include, for each of the initial keys, generating a modified key and associating the modified key with the initial key. At 106, the method includes processing information from the pre-sorting operation (e.g., processing information about the modified keys) in order to reorder the initial keys in memory. Step 108 specifically shows performing one or more processing operations on the modified keys in order to change the ordering of the initial keys in memory.

In the example of FIG. 2, key modification is performed by doing an initial processing of a subset of the numerical values (e.g., bits) that define each key. This may be implemented in the context of the initial keys having a fixed bit-width size, although implementations are possible where key size varies from key to key. The specific implementation in the figure is to process the X most significant bits of the keys. The keys in the figure are 12-bit keys, and the figure shows, in a first iteration, processing of the eight (X=8) most significant bits of each key. The processing yields a smaller size index (definable in the example by 3 bits—5 is the highest integer) that reflects the numerical ranking/sequence of the keys based on the values of those uppermost bits. Such a production of modified keys with a smaller size index is an example of the step shown at 110, in which a size reduction operation is performed to reduce the amount of data that must be processed in downstream sorting operations. A still more specific example of size-reducing key modification entails processing a subset of bits of the initial key, as shown at 112. Step 114 further illustrates a size reduction implementation in which the initial keys can take on 2^N possible values. The keys are then compressed to have a smaller "key space", specifically the modified keys can take on 2^M possible values, where M is less than N.

It will again be appreciated that the above example involves a "compression" of the keys. This may be alternately conceived as generating a reduced key space. Key compression is shown at 116 in FIG. 1, and at 118 processing operations are performed on the compressed keys to reorder the initial keys in memory. In the example of FIG. 2, the initial 12-bit size of the keys correlates to an initial key space of 2^12 values, meaning that each key can take on one of 2^12 possible values. Classifying/indexing the keys based on the value of the uppermost eight bits results in a temporary data structure that has 2^8 potential "bins" or "slots". In the example of FIG. 2, the data structure has a 3F entry corresponding to any key that has those values for its uppermost eight bits. Keys 200a and 200h are both assigned to this entry in the data structure. It will thus be appreciated that a slot in the data structure could potentially contain up to sixteen different keys, since the lowermost four bits are retained in an uncompressed state.

The slots/bins may be implemented as a bit vector array which, in the present example, has 2^8 slots.

There ultimately are only six entries in the data structure having associated keys (0C, 20, 3F, 70, A0, F7). The method therefore may include classifying the entries in the data structure/bit vector array as being "active" or "inactive," where active signifies that there is at least one key corresponding to the data structure entry. Each entry of the data structure that is designated "active" is assigned a compact index, in accordance with the order of the entries, which is then used to replace the 8 highest bits of the keys. The compact indices in the first iteration (204) range from 0 to 5, and are shown in column 202 of FIG. 2—i.e., in a data structure with 2^8 entries, six of the entries are active. It will be further noted that two of the entries (0C and 3F) have multiple keys (two keys each).

The active/inactive designation thus reduces the amount of data that eventually must be sorted. This presupposes that at least half of the data structure slots are empty (inactive) which will be the case whenever X is chosen so that 2^X is greater than or equal to twice the number of keys.

The key compression may be performed iteratively over multiple cycles, to create successively smaller key spaces, as shown at 120 in FIG. 1. Specifically, as shown in FIG. 2, the first iteration 204 reduces the key space from twelve to seven bits. There further is a second iteration 206 that further reduces the key space to three bits (base 10 integer values 0 through 7). Each iteration successively yields smaller and smaller key spaces, with the reduced amount of data enabling faster and more efficient sorting operations.

When a subset of the bits of a key are compressed, and the final sort proceeds without considering the remaining uncompressed bits, the sort may be characterized as being "approximate." With specific reference to the first iteration of the 12-bit example above, the four lowermost bits are not compressed. As a result, there may be up to sixteen different keys within a given entry in the temporary data structure. If the keys are then reordered based on the value of the 8-bit compressed key, the resulting sort will be approximate, in the sense that a higher-valued key may precede a lower-valued key in the final sort, assuming again that both keys are equal-valued in their uppermost 8-bits. In other words, for a given set of keys having the same value in their uppermost bits, the actual sort that occurs will result in an arbitrary sequence of those keys, including sequences in which the keys are out of order.

Approximate sorting may be useful in applications that do not require sorting for correctness per se. Reordering data items so that similar items are placed close to each other may, for example, improve cache hit rate, reduce memory latencies, and reduce power consumption on certain processor architectures. These benefits can often be realized through approximate sorting, which can be significantly faster than full sorting.

In some examples, the overall sorting operation may take on a hybrid character, in which one sorting algorithm is used initially, with one or more different algorithms being used at subsequent sorting stages. One can imagine a sorting technique that is particularly desirable, but effective only when the key space is less than a particular size threshold. Accordingly, one or more initial methods may be employed until key compression iterations reduce the key space to below that threshold, at which point the desirable sorting methodology could be employed to achieve the final reordering in memory.

Figure 3:
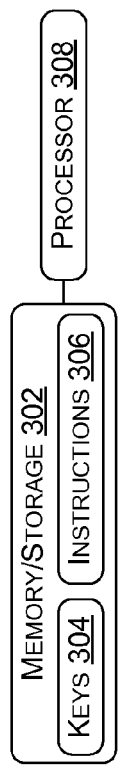
FIG. 3 depicts an exemplary computing system that can be used to carry out the example sorting methods described herein.

It will be readily apparent that the sorting examples described herein may be implemented on any type of computing system, such as computing system 300 in FIG. 3.

System 300 includes a memory/storage subsystem 302, which may contain keys 304 to be sorted and instructions 306 that are executable by processing logic 308. The instruction execution is operative to perform sorting employing modified and/or compressed keys, as described herein, to achieve a desired reordering of keys 304 in memory/storage based on their numerical values. In addition to or instead of executable instructions, the processing logic hardware itself may include hardware operative to provide the sorting functionality described herein.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware in addition to or instead of the specific examples described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method of reordering keys within a memory/storage subsystem of a computing device, the method comprising:
   generating a modified key for each initial key of a plurality of initial keys that are in an initial order, thereby producing a plurality of modified keys where the initial keys are defined such that each can take on one of 2^N values and where the modified keys are such that each can take on one of 2^M values, where M<N, where the generating comprises, for each of the initial keys:
      placing an initial key in a bin of a plurality of bins according to the value of the X most significant bits of the initial key;
      as a result of the placing, assigning an index to the bin, wherein each index comprises less than X bits, where X is chosen so that 2^X is not less than twice the number of initial keys in the plurality of initial keys;
      replacing the X most significant bits of the initial key with the index for the bin in which the initial key was placed;
      repeating the placing, the assigning, and the replacing through the least significant bits of the initial key, thereby generating the modified key; and
      with the initial keys still in the initial order, associating the modified key with the initial key; and
   after the modified keys are so produced, changing the initial order of the initial keys within the memory/storage subsystem according to the values of the modified keys.

2. The method of claim 1, wherein the modified key is smaller in size than the initial key.

3. The method of claim 1, wherein the initial key has a fixed bit-width size via which its value can be expressed using N bits, and wherein the modified key is generated by processing a subset of the N bits of the initial key.

4. The method of claim 1, further comprising establishing a bit vector array with 2^M slots and marking each slot as being active or inactive based on whether the slot is associated with one or more of the initial keys.

5. A method or reordering keys within a memory/storage subsystem of a computing device, the method comprising:

for each uncompressed key of a plurality of uncompressed keys that are in an initial order, compressing an uncompressed key to create a compressed key that is smaller in size than the uncompressed key, thereby producing a plurality of compressed keys, wherein the uncompressed keys are defined such that each can take on one of $2^N$ values and wherein the compressed keys are such that each can take on one of $2^M$ values, where M<N, and wherein the compressing comprises:

placing the uncompressed key in a bin of a plurality of bins according to the value of the X most significant bits of the uncompressed key;

as a result of the placing, assigning an index to the bin, wherein each index comprises less than X bits, where X is chosen so that $2^X$ is not less than twice the number of uncompressed keys in the plurality of uncompressed keys;

replacing the X most significant bits of the uncompressed key with the index to produce an intermediately compressed key;

repeating the placing, the assigning, and the replacing on the X most significant bits of the intermediately compressed key, and continuing the repeating through the least significant bits, thereby generating the compressed key; and with the initial keys still in the initial order, associating the modified key with the initial key; and after the compressed keys are so produced, changing the initial order of the uncompressed keys within the memory/storage subsystem according to the values of the compressed keys.

6. A computing system including code and/or hardware operative to reorder keys, the computing system comprising:

a memory/storage subsystem containing a plurality of initial keys that are in an initial order; and processing logic coupled to the memory/storage subsystem and configured to generate a modified key for each initial key of the plurality of initial keys, thereby producing a plurality of modified keys where the initial keys are defined such that each can take on one of $2^N$ values and where the modified keys are such that each can take on one of $2^M$ values and where M<N, by: (i) placing an initial key of the initial keys in a bin of a plurality of bins according to the value of the X most significant bits of the initial key, where X is chosen so that $2^X$ is not less than twice the number of keys in the plurality of initial keys; (ii) as a result of the placing, assigning an index to the bin, wherein each index comprises less than X bits, wherein after the placing and assigning is completed for each of the initial keys only bins that contain at least one initial key have an index; (iii) replacing the X most significant bits of the initial key with the index for the bin in which the initial key was placed; (iv) repeating the placing, the assigning, and the replacing until all bits of the initial key are replaced, thereby generating the modified key; and (v) with the initial keys still in the initial order, associating the modified key with the initial key; and (vi) after the modified keys are produced, changing the initial order of the initial keys in the memory/storage subsystem according to the values of the modified keys.

7. The system of claim 6, wherein the modified key is smaller in size than the initial key.

8. The system of claim 6, wherein the initial key has a fixed bit-width size via which its value can be expressed using N bits, and wherein the modified key is generated by processing a subset of the N bits of the initial key.

9. The system of claim 6, further comprising establishing a bit vector array with $2^M$ slots and marking each slot as being active or inactive based on whether the slot is associated with one or more of the initial keys.

10. The method of claim 5, further comprising establishing a bit vector array with $2^M$ slots and marking each slot as being active or inactive based on whether the slot is associated with one or more of the uncompressed keys.

* * * * *